US012693491B2

(12) United States Patent
Sato

(10) Patent No.: US 12,693,491 B2
(45) Date of Patent: Jul. 28, 2026

(54) LENS APPARATUS AND IMAGE PICKUP APPARATUS

(71) Applicant: CANON KABUSHIKI KAISHA, Tokyo (JP)

(72) Inventor: Takehiko Sato, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 288 days.

(21) Appl. No.: 18/402,965

(22) Filed: Jan. 3, 2024

(65) Prior Publication Data

US 2024/0248281 A1 Jul. 25, 2024

(30) Foreign Application Priority Data

Jan. 25, 2023 (JP) .................................. 2023-009559

(51) Int. Cl.
*G02B 7/10* (2021.01)

(52) U.S. Cl.
CPC ...................................... *G02B 7/10* (2013.01)

(58) Field of Classification Search
CPC .................................. G02B 7/10; G02B 7/102
USPC .......................... 359/642, 811, 819, 822, 823
See application file for complete search history.

(56) References Cited

U.S. PATENT DOCUMENTS 6,038,404 A 3/2000 Suzuki et al.

FOREIGN PATENT DOCUMENTS

| JP | S6361209 A | 3/1988 |
|---|---|---|
| JP | H03056913 A | 3/1991 |
| JP | H06242362 A | 9/1994 |
| JP | 2002189166 A * | 7/2002 |
| JP | 3324379 B2 | 9/2002 |
| JP | 2009169312 A | 7/2009 |
| JP | 2014077945 A | 5/2014 |
| JP | 2017026771 A | 2/2017 |

* cited by examiner

*Primary Examiner* — Tuyen Tra
(74) *Attorney, Agent, or Firm* — ROSSI, KIMMS & McDOWELL LLP

(57) ABSTRACT

A lens apparatus includes an optical system including at least one movable lens unit that moves along an optical axis of the optical system and at least one fixed lens unit that does not move along the optical axis, an operation member disposed outside at least part of the optical system in a direction orthogonal to the optical axis and operable by a user, and a driving unit configured to be controlled according to an operation of the operation member, to drive the movable lens unit. A predetermined inequality is satisfied.

6 Claims, 8 Drawing Sheets

LENS APPARATUS AND IMAGE PICKUP APPARATUS

BACKGROUND

Technical Field

One of the aspects of the embodiments relates to an image pickup apparatus mounted with a lens barrel that can provide zooming and focusing of an optical system using manually operable operation members provided on the exterior of the body of the lens barrel.

Description of Related Art

A lens apparatus as an interchangeable lens or the like has an operation member (operation ring) rotationally operable about an optical axis on its exterior. A user rotationally operates the operation member to provide zooming or focusing of the optical system in the lens apparatus. Japanese Patent No. 3324379 discloses a lens apparatus that detects a rotational amount of a focus operation ring and controls the energization of an actuator for focus driving.

The lens apparatus is demanded to have a smaller size (especially a smaller diameter). However, in the lens apparatus provided with the operation member on its exterior as described above, the dimensions of the operation member are added to the outer diameter of the optical system, and it becomes difficult to reduce the size of the lens apparatus.

SUMMARY

A lens apparatus according to one aspect of the embodiment includes an optical system including at least one movable lens unit that moves along an optical axis of the optical system and at least one fixed lens unit that does not move along the optical axis, an operation member disposed outside at least part of the optical system in a direction orthogonal to the optical axis and operable by a user, and a driving unit configured to be controlled according to an operation of the operation member, to drive the movable lens unit. The following inequality is satisfied:

$$Dm < Dg \le Df$$

where Df is a larger one of a maximum diameter of the fixed lens unit and a diameter of a circumscribed circle that has a center on the optical axis and circumscribes the driving unit so as to contain the driving unit, and Dg is a diameter of a circle that does not contain the operation member, contacts the operation member, and has a center on the optical axis, and Dm is a maximum diameter of the movable lens unit. An image pickup apparatus having the above lens apparatus also constitutes another aspect of the embodiment.

Further features of the disclosure will become apparent from the following description of embodiments with reference to the attached drawings.

DESCRIPTION OF THE EMBODIMENTS

Referring now to the accompanying drawings, a detailed description will be given of embodiments according to the disclosure.

First Embodiment

Figure 5:
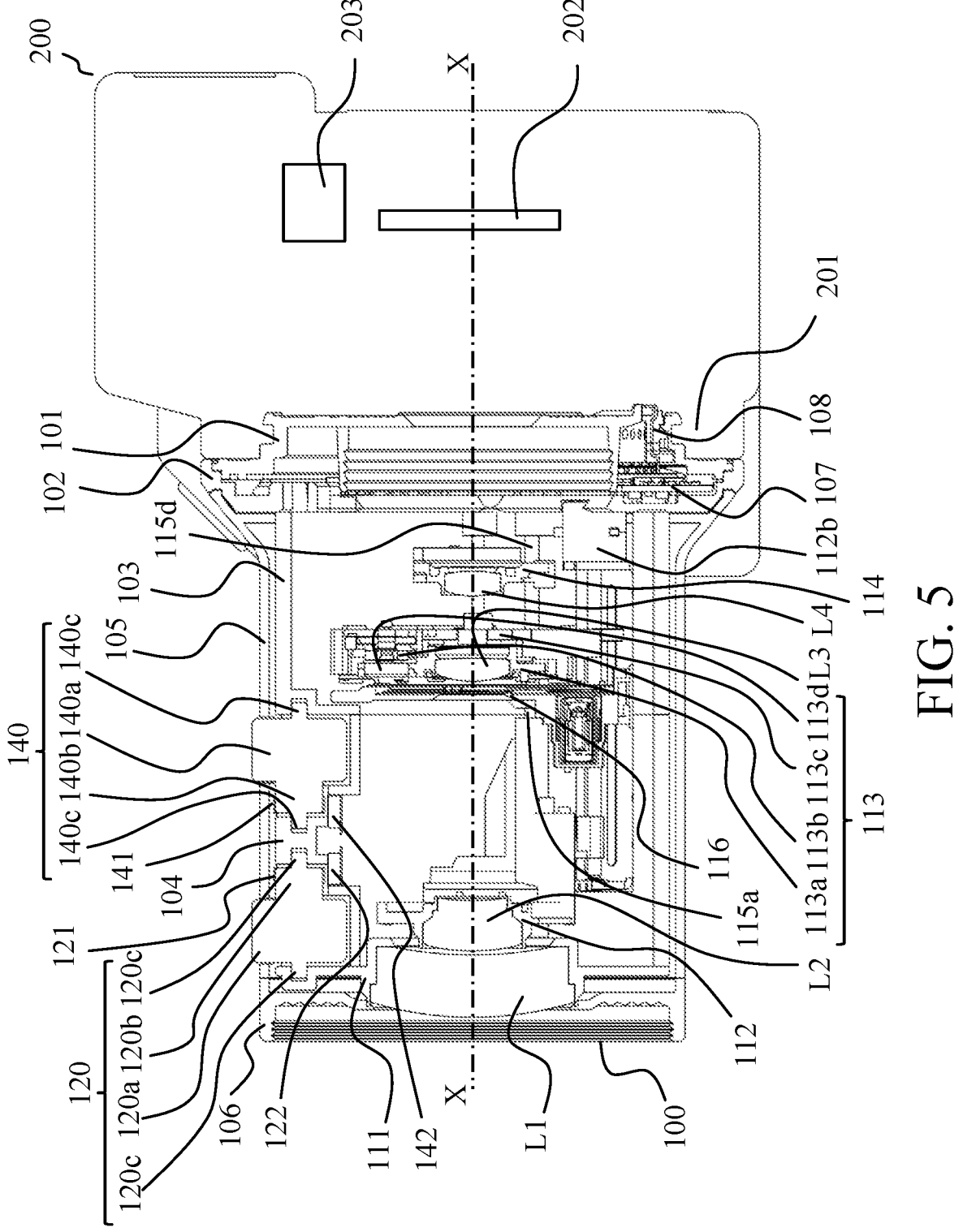
FIG. 5 is a sectional view of a camera system including the interchangeable lens according to the first embodiment.

FIG. 5 illustrates the configuration of a camera system including an interchangeable lens 100 as a lens apparatus according to a first embodiment. The interchangeable lens 100 is attached to and detached from a lens interchangeable type single-lens reflex camera body 200, which serves as an image pickup apparatus, in a case where a mount 101 of the interchangeable lens 100 is bayonet-mounted with a camera mount 201 provided in the camera body 200. A line X-X in FIG. 5 represents an optical axis of an optical system in the interchangeable lens 100, and a direction along the optical axis will be called an optical axis direction. A direction orthogonal to the optical axis (a radial direction from the optical axis) will be called a radial direction.

The interchangeable lens 100 has an optical system including, in order from an object side, four lens units L1 to L4 having positive, negative, positive, and positive refractive powers and configured to provide magnification variation (zooming). During zooming, the first lens unit L1 closest to the object is fixed, and the second lens unit L2 on the image side of the first lens unit L1 moves in the optical axis direction. The third lens unit L3 corrects image blur (provides image stabilization) by moving in a plane orthogonal to the optical axis. The fourth lens unit L4 performs focusing by moving in the optical axis direction. An electromagnetic aperture unit 116 is disposed between the second lens unit L2 and the third lens unit L3. A lens unit is a group of one or more lenses that move together during zooming and focusing, and a distance between adjacent lens units changes during zooming and focusing.

An outer barrel 105 is fixed to the mount 101 together with a rear base barrel 103 and a fixed barrel 102. A control board 107 is electrically connected to a contact block 108 provided in the mount 101, and communicates with the camera body 200, receives power, and the like through the contact block 108.

A front base barrel 104 is fixed to the rear base barrel 103. A filter frame 106 is fixed to an end on the object side of the outer barrel 105. Accessories such as a polarization filter, a protective filter, or the like can be attached to the filter frame 106.

The first lens unit L1 is held by a first (unit) barrel 111. The first barrel 111 is fixed to the front base barrel 104. The electromagnetic aperture unit 116 is held by the rear base barrel 103 and is electrically connected to the control board 107.

The second lens unit L2 is held by a second (unit) barrel 112. The second barrel 112 is guided in the optical axis direction by two guide bars including a guide bar 115a. The two guide bars are held at both ends by the first barrel 111 and the rear base barrel 103.

A second (unit) driving unit 112b includes a stepping motor having a rotor provided with a leadscrew. The leadscrew is threaded with a rack attached to the second barrel 112, and the second barrel 112 (the second lens unit L2) is driven in the optical axis direction by rotation of the rotor. The second driving unit 112b is fixed to the front base barrel 104 and the rear base barrel 103. The second driving unit 112b is electrically connected to the control board 107 through a flexible printed circuit (FPC). A second (unit) scale is bonded to the second barrel 112. An optical pattern which is continuous in the optical axis direction is formed in the second scale. The control board 107 can detect the position, in the optical axis direction, of the second barrel 112 relative to the front base barrel 104 by obtaining a pulse signal according to the optical pattern in the second scale through an optical position sensor electrically connected to the control board and attached to the front base barrel 104.

The third lens unit L3 is held by a third (unit) barrel 113a that can be moved (shifted) within a plane orthogonal to the optical axis relative to a shift base 113c in the image stabilizing unit. The shift base 113c is held by the rear base barrel 103. A drive coil 113b is held in the third barrel 113a, and a drive magnet 113d is held in the shift base 113c and opposite to the drive coil 113b in the optical axis direction. A voice coil motor serving as a shift actuator is constituted by the drive coil 113b and the drive magnet 113d.

The control board 107 controls the energization of the drive coil 113b based on shake of the interchangeable lens 100 detected by an unillustrated shake sensor, such as a gyro sensor, provided in the interchangeable lens 100. Lorentz force arises between the energized drive coil 113b and the drive magnet 113d, and the third barrel 113a is shifted by this Lorentz force. The image stabilizing unit 113 also includes a shift position sensor that detects a shift position (driving amount) from the optical axis of the third barrel 113a. The control board 107 performs feedback control of the shift position of the third barrel 113a, that is, the energization of the drive coil 113b, using the output of the shift position sensor.

The fourth lens unit L4 is held by a fourth (unit) barrel 114. The fourth barrel 114 is guided in the optical axis direction by two guide bars including a guide bar 115d. The two guide bars are held at both ends by the front base barrel 104 and the rear base barrel 103.

A fourth (unit) driving unit 114b (see FIG. 2) includes a stepping motor having a rotor provided with a leadscrew. The leadscrew is threaded with a rack attached to the fourth lens unit L4, and the fourth barrel 114 is driven in the optical axis direction by rotation of the rotor. The fourth driving unit 114b is fixed to the rear base barrel 103. The fourth driving unit 114b is electrically connected to the control board 107 through an FPC. A fourth (unit) scale is bonded to the fourth barrel 114. An optical pattern which is continuous in the optical axis direction is formed in the fourth scale. The control board 107 can detect the position, in the optical axis direction, of the fourth barrel 114 relative to the rear base barrel 103 by obtaining a pulse signal according to the optical pattern in the fourth scale through an optical position sensor electrically connected to the control board 107 and attached to the rear base barrel 103.

A position sensor other than the optical position sensor, such as a magnetic sensor (an MR encoder) that can output a signal according to a magnetic pattern, may be used as the position sensor that detects the positions of the second barrel 112 and the fourth barrel 114.

A zoom operation member 120 includes an operation unit 120a that is rotationally operable by the user and two rotation shafts 120c that extend in the optical axis direction on both sides of the operation unit 120a in the optical axis direction, and is rotatably held by the first barrel 111 and the front base barrel 104 via the rotation shafts 120c.

The zoom operation member 120 and a focus operation member 140, described below in this embodiment are roller members that can be rotated about an axis in a position distant from the optical axis in a radial direction. The zoom operation member 120 and the focus operation member 140 are disposed radially outside the movable range of the second lens unit L2 during zooming, i.e., outside the optical system including the first to fourth lens units L1 to L4 in the radial direction.

Figures 2, 3:
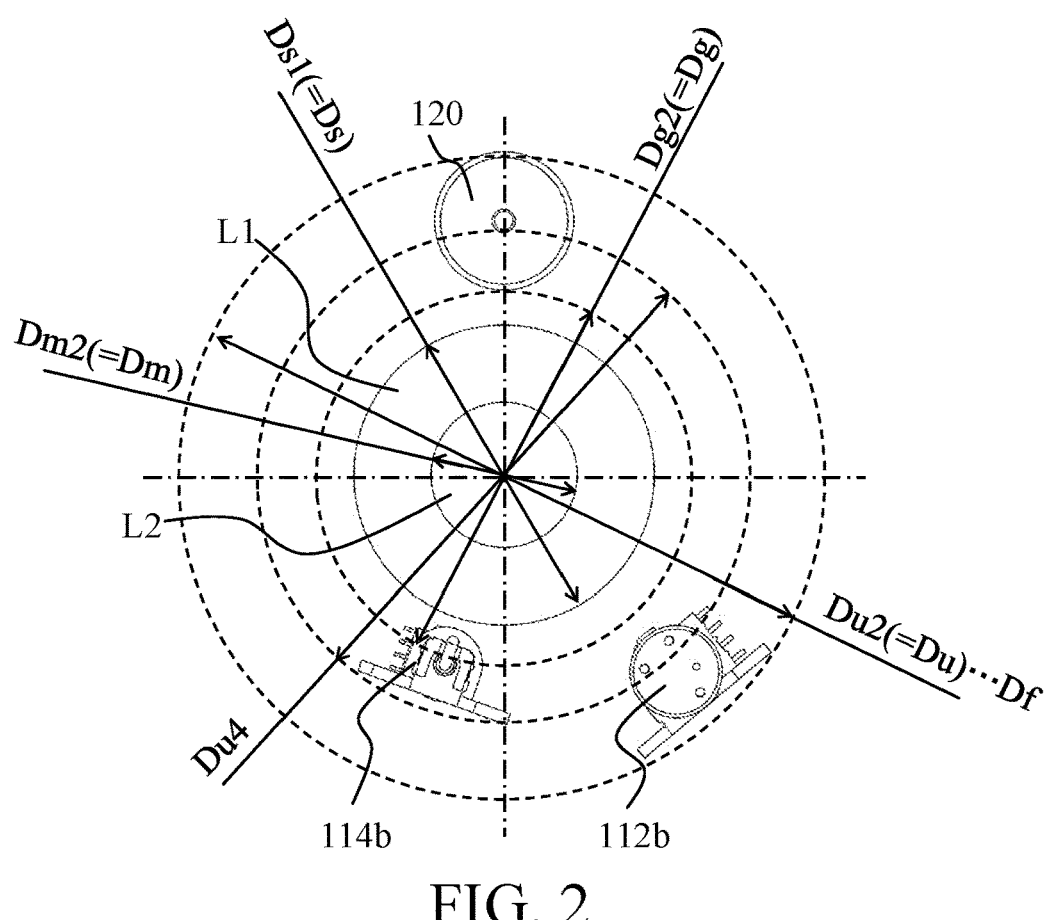
FIG. 2 illustrates the interchangeable lens according to the first embodiment viewed from an optical axis direction.
FIG. 3 is a perspective view of the interchangeable lens according to the first embodiment.

FIG. 3 illustrates an exterior view of the interchangeable lens 100. A part in a circumferential direction of the operation unit 120a of the zoom operation member 120 is exposed from an opening provided in the outer barrel 105. The user can rotate the exposed part of the zoom operation member 120 by touching that part with his fingers. This is similarly applicable to the focus operation member 140.

In FIG. 5, the zoom operation member 120 includes a scale shaft part 120b, and a zoom operation scale 121 is bonded to an outer circumferential surface of the scale shaft part 120b.

An optical pattern which is continuous in the rotating direction of the zoom operation member 120 is formed in the zoom operation scale 121. The control board 107 can detect the rotational amount of the zoom operation member 120 by obtaining a pulse signal according to the optical pattern of the zoom operation scale through a zoom operation optical sensor electrically connected to the control board 107 and attached to the front base barrel 104. The control board 107 controls driving of the second driving unit 112b according to the detected rotational amount of the zoom operation member 120. Thereby, electric zoom can be provided according to the zoom operation member 120 rotationally operated by the user.

The focus operation member 140 includes an operation unit 140a that is rotationally operable by the user and two rotation shafts 140c that extend in the optical axis direction on both sides of the operation unit 140a in the optical axis direction, and is rotatably held by the front base barrel 104 and the rear base barrel 103 through the rotation shafts 140c. The focus operation member 140 includes a scale shaft part 140b, and a focus operation scale 141 is bonded to an outer circumferential surface of the scale shaft part 140b.

An optical pattern which is continuous in the rotating direction of the focus operation member 140 is formed in the focus operation scale 141. The control board 107 can detect the rotational amount of the focus operation member 140 by obtaining a pulse signal according to the optical pattern of the focus operation scale through a focus operation optical sensor electrically connected to the control board 107 and attached to the rear base barrel 103. The control board 107 controls driving of the fourth driving unit 114b according to the detected rotational amount of the focus operation member 140. Thereby, electric focus can be provided according to the focus operation member 140 rotationally operated by the user.

A rotational amount sensor other than the optical sensor, such as a magnetic sensor (an MR encoder) that can output a signal according to a magnetic pattern, may be used as the rotational amount sensor that detects the rotational amount of the zoom operation member 120 and the focus operation member 140.

An image sensor 202, such as a CCD sensor or a CMOS sensor, is provided in the camera body 200. The image sensor 202 photoelectrically converts (captures) an object image as an optical image formed by the optical system in the interchangeable lens 100 and outputs a captured image signal. A camera control circuit 203 in the camera body 200 performs image processing on the captured image signal to generate image data for display or recording.

Figure 1:
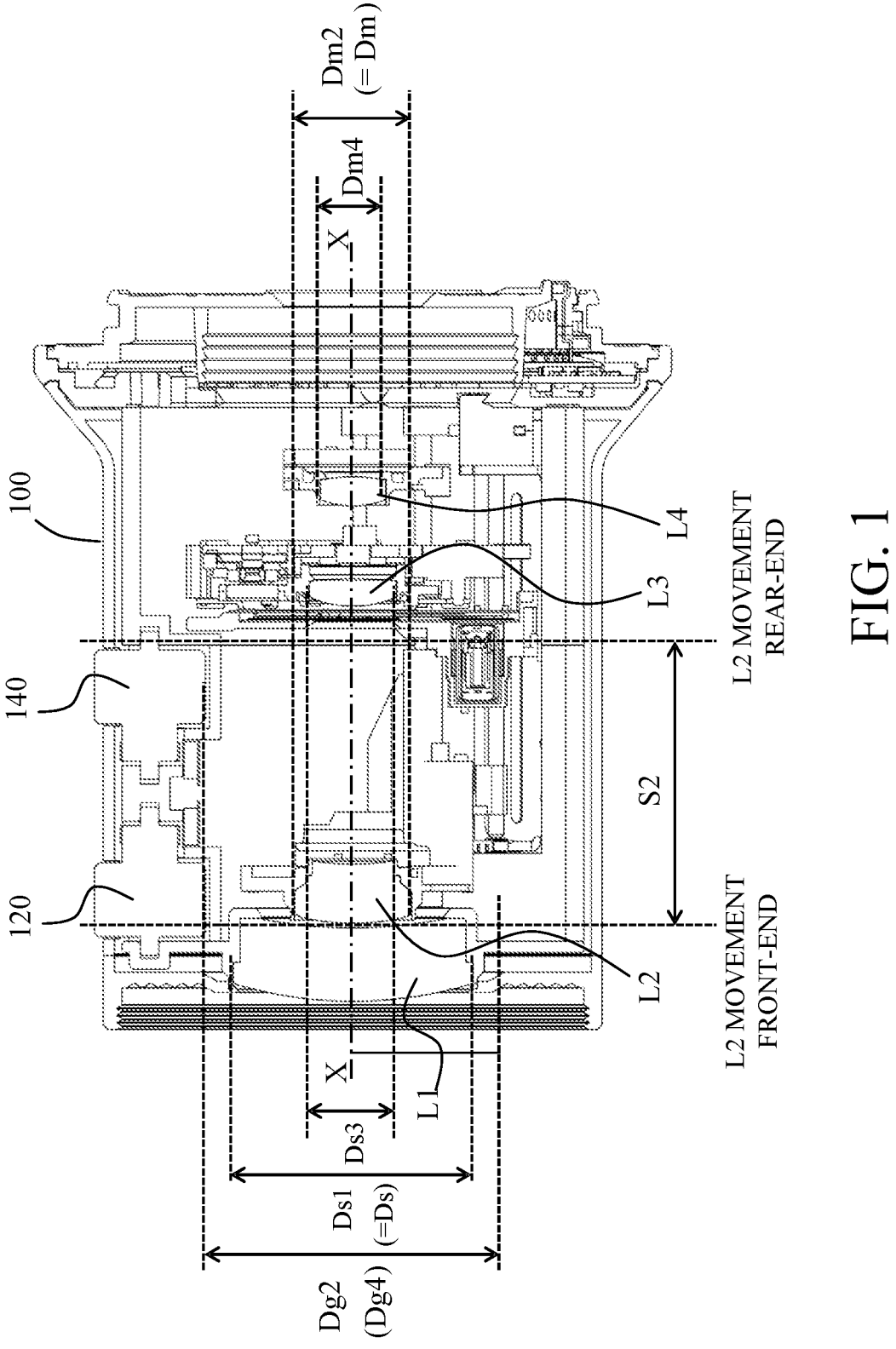
FIG. 1 is a sectional view of an interchangeable lens according to a first embodiment.
Figure 4:
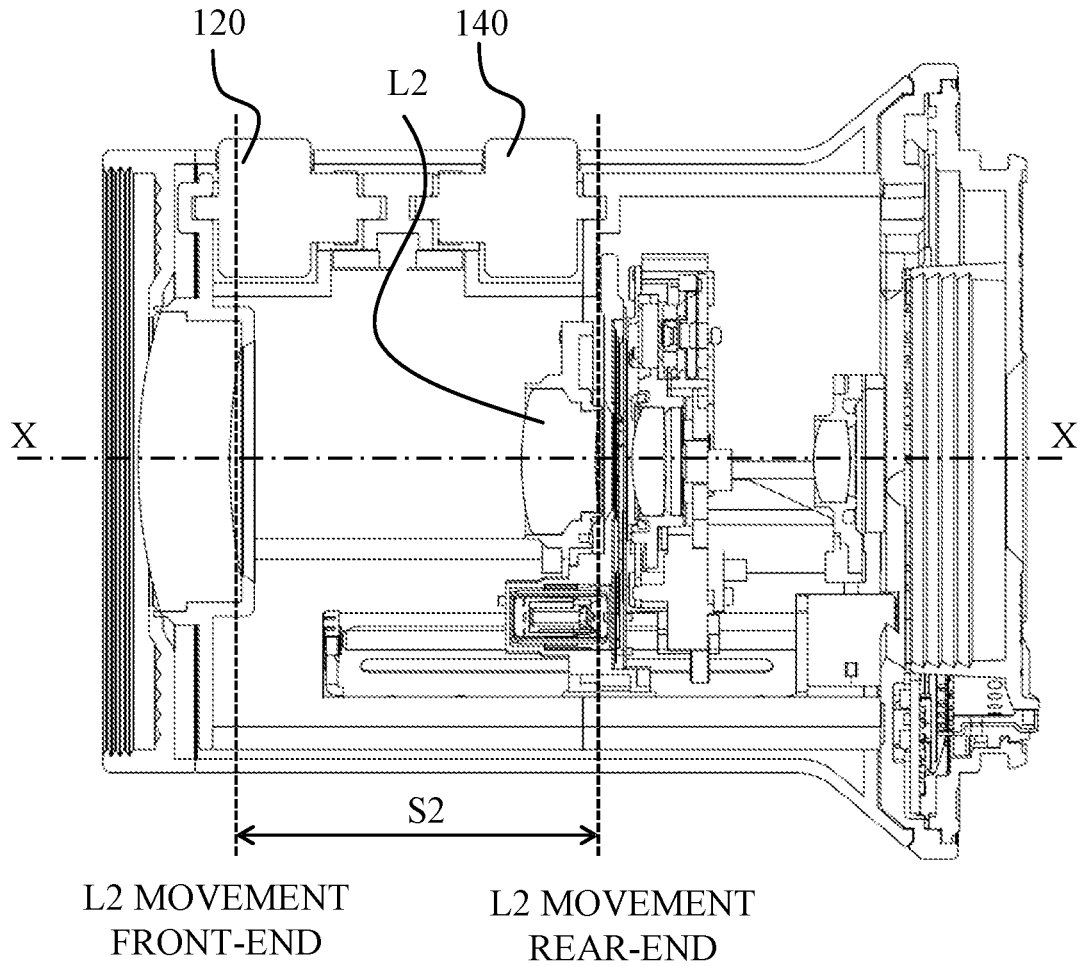
FIG. 4 is another sectional view of the interchangeable lens according to the first embodiment.

FIG. 1 illustrates the configuration of the interchangeable lens 100 according to the first embodiment at a wide-angle end. The second lens unit L2 is located at an end closest to the object in the movable range S2 in the optical axis direction (L2 movement front-end). FIG. 2 schematically illustrates some of the components of the interchangeable lens 100 when viewed from the optical axis direction. FIG. 4 illustrates the configuration of the interchangeable lens 100 at the telephoto end. The second lens unit L2 is located at an end closest to the image plane in the movable range S2 in the optical axis direction (L2 movement rear-end). The following description will collectively refer to the first lens unit L1 and the third lens unit L3 that do not move in the optical axis direction as a fixed lens unit, and the second lens unit L2 and the fourth lens unit L4 that move in the optical axis direction as a movable lens unit.

As illustrated in FIG. 1, where Ds is a maximum diameter of the fixed lens unit, Ds1 is a maximum diameter of the first lens unit L1, and Ds3 is a maximum diameter of the third lens unit L3, the maximum diameter of the fixed lens unit is the diameter Ds1 of the first lens unit L1, and the following relationship is met in this embodiment:

$$Ds3 < Ds1 = Ds.$$

The maximum diameter of the lens unit is not a maximum diameter of an effective region through which an effective light beam contributing to imaging in the lens unit passes, but is a maximum diameter including parts of the lens barrels for holding the lens units.

Where Dm is a maximum diameter of the movable lens unit, Dm2 is a maximum diameter of the second lens unit L2, and Dm4 is a maximum diameter of the fourth lens unit L4, the maximum diameter of the movable lens unit is the diameter Dm2 of the second lens unit L2, and the following relationship is met in this embodiment:

$$Dm4 < Dm2 = Dm.$$

As illustrated in FIG. 2, where Du2 is a diameter of a circumscribed circle that has a center on the optical axis and circumscribes the second driving unit 112*b* so as to contain the second driving unit 112*b*, Du4 is a diameter of a circumscribed circle that has a center on the optical axis and circumscribes the fourth driving unit 114*b* so as to contain the fourth driving unit 114*b*, and a larger one of Du2 and Du4 is a maximum diameter Du of the driving unit, the maximum diameter of the driving unit is the diameter Du2 of the circumscribed circle of the second driving unit 112*b*, and the following relationship is met in this embodiment:

$$Du4 < Du2 = Du.$$

Furthermore, where Df is a diameter of a larger one of Ds and Du, the following relationship is met:

$$Ds < Du = Df.$$

Where Dg2 is a diameter of a circle that has a center on the optical axis and contacts the zoom operation member 120 rather than containing the zoom operation member 120, Dg4 is a diameter of a circle that has a center on the optical axis and contacts the focus operation member 140 rather than containing the focus operation member 140, and Dg is a diameter of a smaller of Dg2 and Dg4, the following relationship is met:

$$Dg2 = Dg4 = Dg.$$

As illustrated in FIG. 2, this embodiment satisfies the following inequality:

$$Dm < Dg \leq Df \qquad (1)$$

In other words, this embodiment place the zoom operation member 120 and the focus operation member 140 close to the optical axis such that inequality (1) is satisfied.

As illustrated in FIGS. 1 and 4, in the optical axis direction, the zoom operation member 120 and the focus operation member 140 are at least partially provided within the movable range S2 of the zoom of the second lens unit L2. Parts other than the operation units 120*a* and 140*a*, such as the rotation shafts 120*c* and 140*c* and the like, are also included in the at least parts of the zoom operation member 120 and the focus operation member 140.

The interchangeable lens 100 having the above configuration can arrange the zoom operation member 120 and the focus operation member 140 on the outer circumference of the optical system while suppressing an increase of the overall outer diameter.

In this embodiment, the operation member is a member that rotates about an axis parallel to the optical axis, but the operation member may be a member that slides in the optical axis direction, or a member that swings like a seesaw, as in a second embodiment described below. The operation member may be an operation ring that rotates about the optical axis.

This embodiment arranges the zoom operation member 120 and the focus operation member 140 outside in the radial direction of the movable unit (the second lens unit L2), and both of them satisfy inequality (1). However, inequality (1) may be satisfied by disposing one of the zoom operation member and the focus operation member outside in the radial direction of the movable unit.

Although the inequality Ds<Du is satisfied in this embodiment as described above, in the case of Ds≥Du, at least one of the zoom operation member and the focus operation member may be disposed such that the inequality Dg≤Ds, which is the maximum diameter of the fixed lens unit. Thereby, an increase in the diameter of the interchangeable lens can be suppressed.

Second Embodiment

Figure 6:
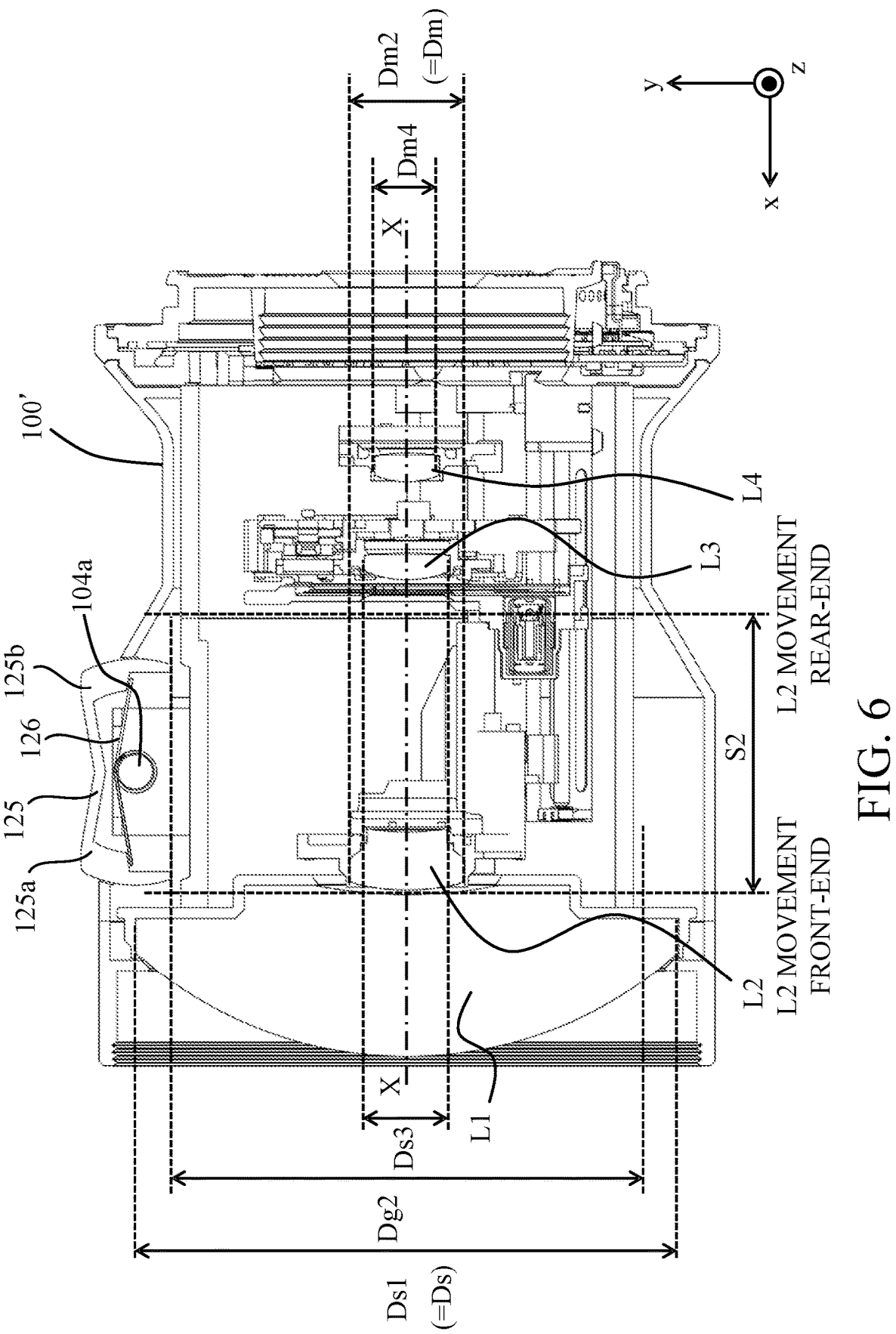
FIG. 6 is a sectional view of an interchangeable lens according to a second embodiment.
Figure 7:
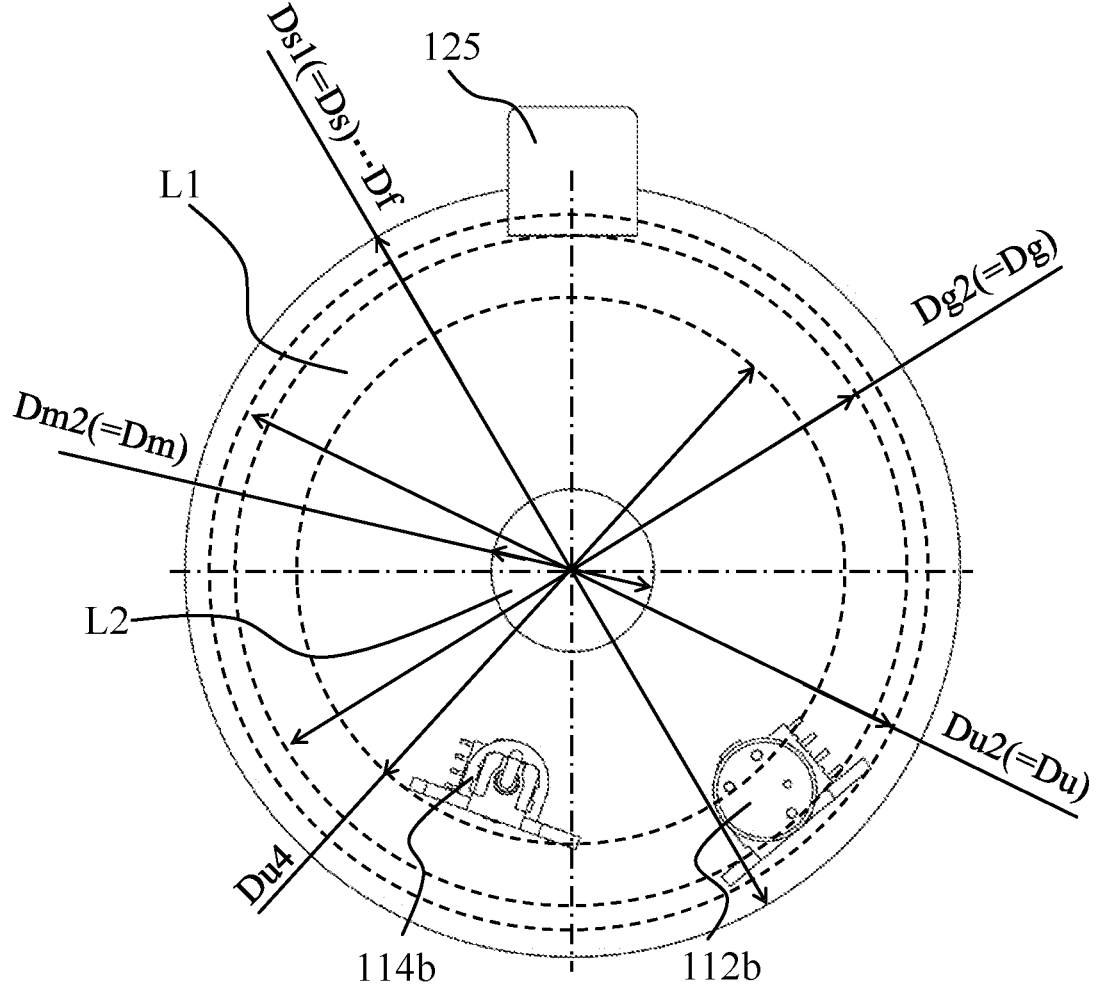
FIG. 7 illustrates the interchangeable lens according to the second embodiment viewed from an optical axis direction.
Figure 8:
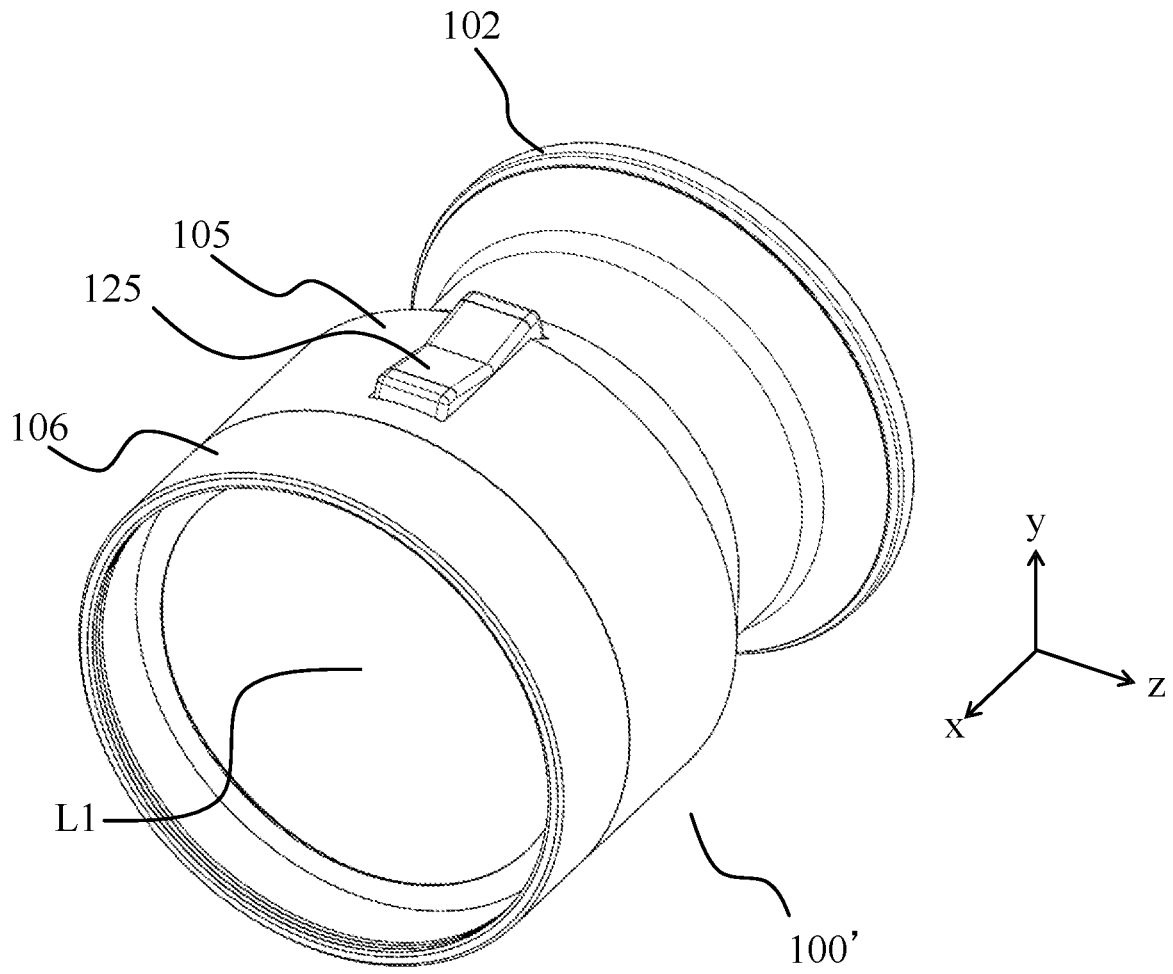
FIG. 8 is a perspective view of the interchangeable lens according to the second embodiment.
Figure 9:
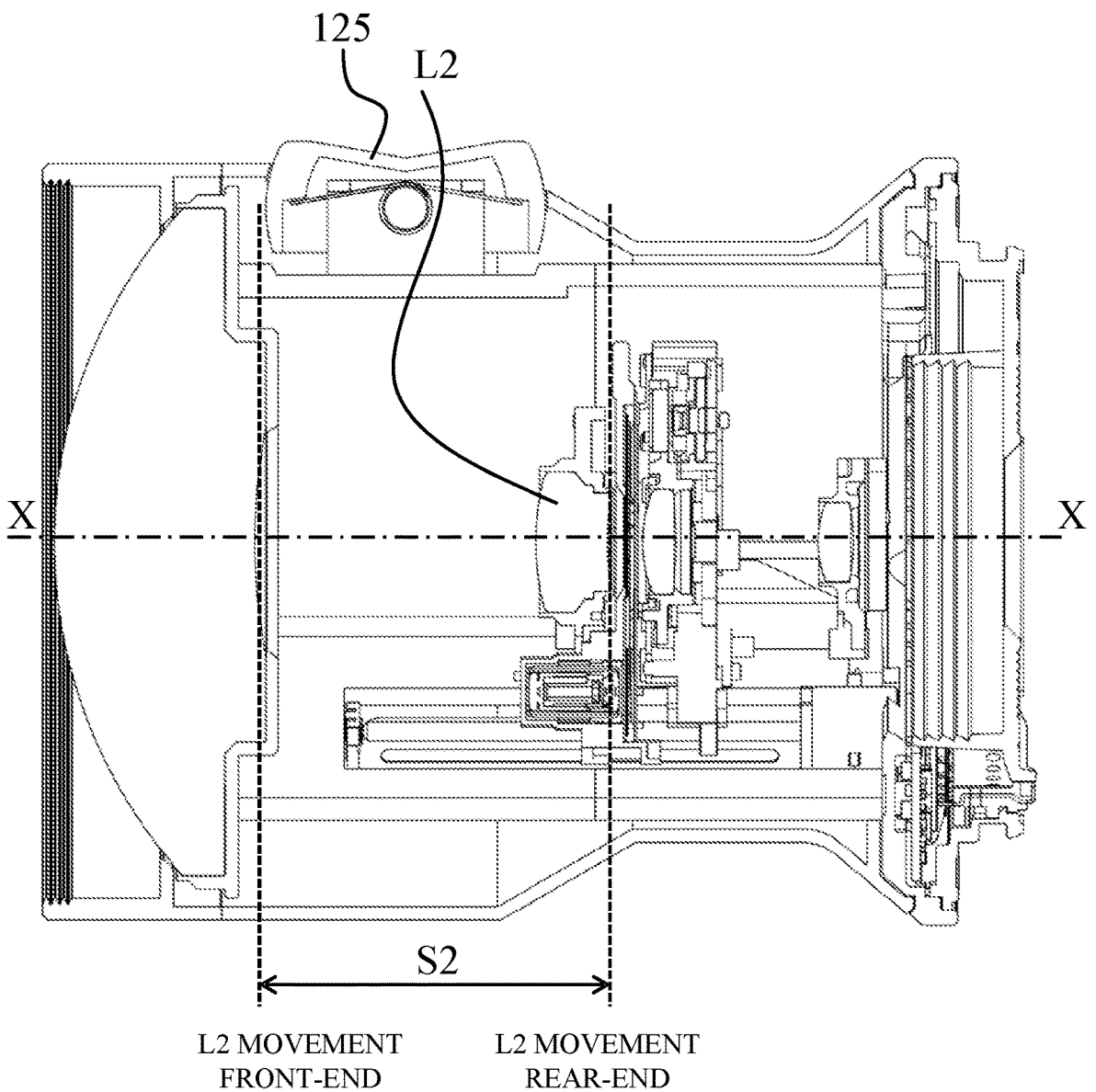
FIG. 9 is another sectional view of the interchangeable lens according to the second embodiment.

FIGS. 6 to 9 illustrate an interchangeable lens 100' according to a second embodiment. Those elements in this embodiment, which are corresponding elements in the first embodiment, will be designated by the same reference numerals as in the first embodiment. FIG. 6 illustrates the configuration of the interchangeable lens 100' according to the second embodiment at a wide-angle end. The second lens unit L2 is located closest to the end closest to the object in the movable range S2 in the optical axis direction of the second lens unit L2 (L2 movement front-end). FIG. 7 schematically illustrates only some of the components of the interchangeable lens 100 when viewed from the optical axis direction. FIG. 8 illustrates an exterior view of the interchangeable lens 100'. FIG. 9 illustrates the configuration of the interchangeable lens 100' at the telephoto end. The second lens unit L2 is located closest to the end closest to the image plane of the movable range S2 in the optical axis direction thereof (L2 movement rear-end).

As illustrated in FIG. 6, a zoom operation member 125 includes operation portions 125a and 125b on the front and rear sides in the optical axis direction, and is held by a holding shaft 104a provided in the front base barrel 104 in the middle portion in the optical axis direction. The zoom operation member 125 is a seesaw-type member that is swingable about the holding shaft 104a distant from the optical axis in a radial direction, and is held at an illustrated neutral position of the swing by a biasing spring 126. The zoom operation member 125 is disposed radially outside the movable range S2 of the second lens unit L2 during zooming, that is, radially outward from a part of the optical system (the second to fourth lens units L2 to L4).

Instead of the swingable zoom operation member 125, a slide-type zoom operation member that can be moved forward and backward in the optical axis direction may be used, or a pushbutton-type zoom operation member having two buttons provided forward and backward in the optical axis direction may be used.

As illustrated in FIG. 8, the operation portions 125a and 125b of the zoom operation member 125 are exposed to the exterior from an opening provided in the outer barrel 105. The user can swing the zoom operation member 125 by touching the operation portions 125a and 125b with his finger. In other words, in FIG. 6, the user swings the zoom operation member 125 by pressing the operation portion 125a with his finger such that the operation portion 125a drops (the operation portion 125b rises) from the neutral position, and when the user releases his finger from the operation portion 125a, the zoom operation member 125 returns to the neutral position under the biasing force of the biasing spring 126. Similarly, the user swings the zoom operation member 125 by pressing the operation portion 125b with his finger such that the operation portion 125b drops (the operation portion 125a rises) from the neutral position, and when the user releases his finger from the operation portion 125b, the zoom operation member 125 returns to the neutral position under the biasing force of the biasing spring 126.

A swing amount (rotational amount) of the zoom operation member 125 relative to the holding shaft 104a can be detected by an unillustrated rotation sensor, which is fixed to the front base barrel 104. An unnumbered control board controls the second driving unit 112b (see FIG. 7) according to the detected rotational amount of the zoom operation member 125.

In this embodiment, the control board obtains defocus information from the image data obtained through the image sensor in the camera body, and controls the fourth driving unit 114b (see FIG. 7) based on the defocus information. Thereby, autofocus (AF) is performed.

As illustrated in FIGS. 6 and 7, the following relationships are met in this embodiment:

$$Ds3 < Ds1 = Ds = Df$$
$$Dm4 < Dm2 = Dm$$
$$Du4 < Du2 = Du$$
$$Ds > Du$$
$$Dg2 = Dg$$

Even in this embodiment, the zoom operation member 125 is disposed such that inequality (1) is satisfied. As illustrated in FIGS. 6 and 9, in the optical axis direction, the zoom operation member 125 is at least partially provided within the movable range S2 of the zoom of the second lens unit L2.

Thereby, the interchangeable lens 100' according to this embodiment includes the zoom operation member 125 on the outer circumference of the optical system while suppressing an increase of the overall outer diameter.

While each embodiment has described an interchangeable lens for an lens interchangeable type image pickup apparatus as a lens apparatus, the lens apparatus may be provided in a lens integrated type image pickup apparatus. Additionally, in each embodiment, zoom operations and focus operations are performed in a zoom lens having a variable focal length as a lens apparatus, the lens apparatus may be a fixed focal length lens in which only focus operations at a fixed focal length are performed.

While the disclosure has been described with reference to embodiments, it is to be understood that the disclosure is not limited to the disclosed embodiments. The scope of the following claims is to be accorded the broadest interpretation so as to encompass all such modifications and equivalent structures and functions.

Each embodiment can reduce the size of a lens apparatus provided with an operation member on the outside of the optical system.

This application claims the benefit of Japanese Patent Application No. 2023-009559, filed on Jan. 25, 2023, which is hereby incorporated by reference herein in its entirety.

What is claimed is:

1. A lens apparatus comprising:
an optical system including:
at least one movable lens unit that moves along an optical axis of the optical system; and
at least one fixed lens unit that does not move along the optical axis;
an operation member disposed outside at least part of the optical system in a direction orthogonal to the optical axis and operable by a user; and

9

10 a driving unit configured to be controlled according to an operation of the operation member, to drive the movable lens unit, wherein the optical system includes, in order from an object side to an image side, a first lens unit as the fixed lens unit and a second lens unit as the movable lens unit, wherein a maximum diameter of the first lens unit is a maximum diameter of the fixed lens unit, and the maximum diameter of the first lens unit is larger than a diameter of a circumscribed circle that has a center on the optical axis and circumscribes the driving unit so as to contain the driving unit, and wherein the following inequality is satisfied:

$$Dm < Dg \leq Df.$$

where Df is the maximum diameter of the fixed lens unit, Dg is a diameter of a circle that does not contain the operation member, contacts the operation member, and has a center on the optical axis, and Dm is a maximum diameter of the movable lens unit.

2. The lens apparatus according to claim 1, wherein at least part of the operation member is disposed at a position, in a direction along the optical axis, that is within a range, in a direction along the optical axis, in which the movable lens unit is movable.

3. The lens apparatus according to claim 1, wherein the operation member is a member rotatable or swingable about an axis distant from the optical axis in the direction orthogonal to the optical axis, or a member movable in a direction along the optical axis.

4. The lens apparatus according to claim 1, wherein the driving unit drives the second lens unit.

5. The lens apparatus according to claim 4, the second lens unit moves in a direction along the optical axis during zooming.

6. An image pickup apparatus comprising:

a lens apparatus; and an image sensor configured to capture an optical image formed by the lens apparatus, wherein the lens apparatus includes:

an optical system including:

at least one movable lens unit that moves along an optical axis of the optical system; and at least one fixed lens unit that does not move along the optical axis;

an operation member disposed outside at least part of the optical system in a direction orthogonal to the optical axis and operable by a user; and a driving unit configured to be controlled according to an operation of the operation member, to drive the movable lens unit, wherein the optical system includes, in order from an object side to an image side, a first lens unit as the fixed lens unit and a second lens unit as the movable lens unit, wherein a maximum diameter of the first lens unit is a maximum diameter of the fixed lens unit, and the maximum diameter of the first lens unit is larger than a diameter of a circumscribed circle that has a center on the optical axis and circumscribes the driving unit so as to contain the driving unit, and wherein the following inequality is satisfied:

$$Dm < Dg \leq Df,$$

where Df is the maximum diameter of the fixed lens unit, Dg is a diameter of a circle that does not contain the operation member, contacts the operation member, and has a center on the optical axis, and Dm is a maximum diameter of the movable lens unit.

* * * * *